May 23, 1933.  A. A. CLARKE ET AL  1,910,321
ELECTRIC MOTOR
Original Filed June 28, 1928   2 Sheets-Sheet 1
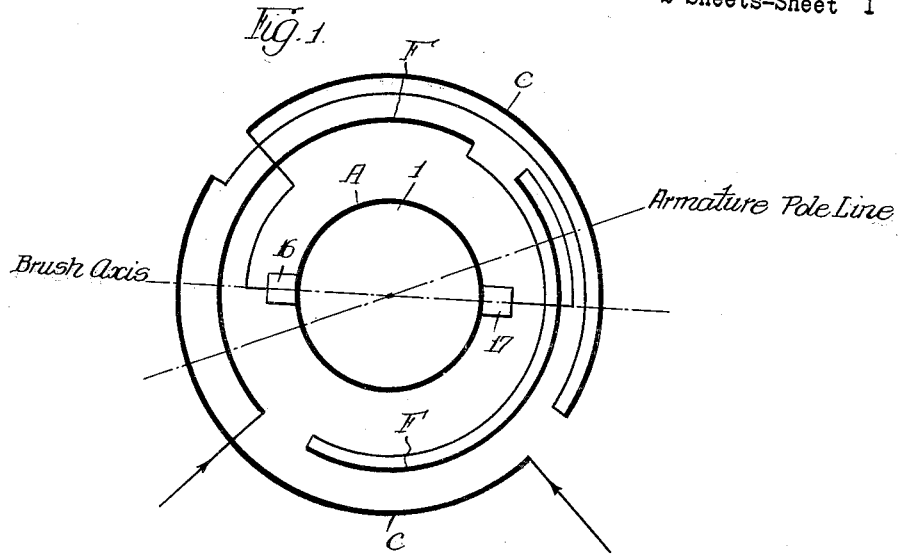
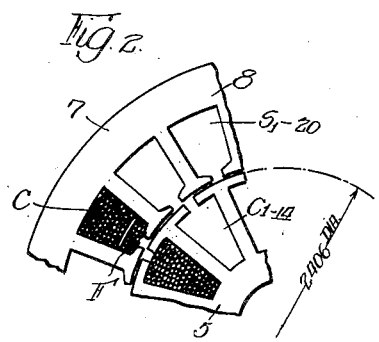
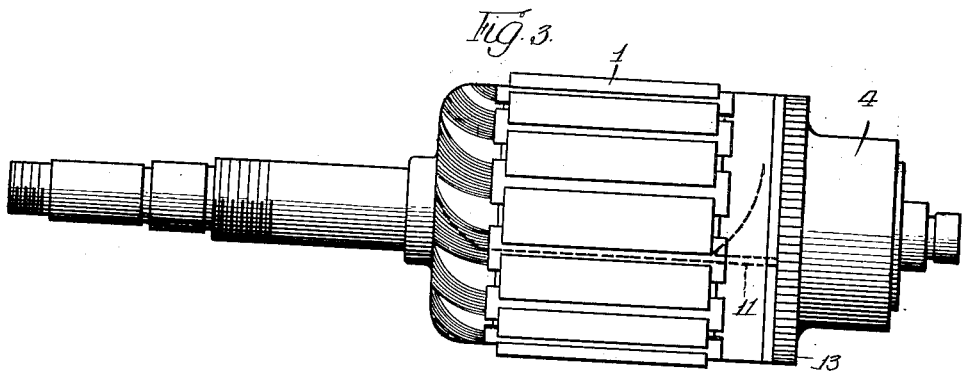
Inventors:
Alex A. Clarke,
John Wilkiewicz,
By Cromwell, Greist & Warden
Attys May 23, 1933.                A. A. CLARKE ET AL                    1,910,321
                              ELECTRIC MOTOR
                        Original Filed June 28, 1928        2 Sheets-Sheet 2

Inventors:
Alex A. Clarke,
John Wilkiewricz,
By Cromwell, Greist & Warden
           attys.

Patented May 23, 1933

1,910,321

UNITED STATES PATENT OFFICE

ALEX A. CLARKE AND JOHN WILKIEWRICZ, OF CHICAGO, ILLINOIS, ASSIGNORS, BY DIRECT AND MESNE ASSIGNMENTS, TO SAID CLARKE AND THOMAS B. BENNETT, OF MUSKEGON, MICHIGAN

ELECTRIC MOTOR

Application filed June 28, 1928, Serial No. 289,035. Renewed September 21, 1932.

This invention relates to electric motors and it has particular relation to motors of the universal type.

Among the objects of the invention is the provision of an improved winding arrangement for motors of the foregoing character, enabling development of more power than winding arrangements used heretofore while at the same time retaining fully the desirable universal characteristics of such motors and also reducing to a minimum the size as well as the material of such motors.

One feature of the inventiton resides in the provision of an improved arrangement of the armature connections between the individual armature coils and the commutator bars, whereby the over-all length of the armature and consequently of the entire motor is materially reduced without detracting from the electrical qualities of the motor.

Another feature of the invention resides in an improved arrangement of the stator windings to secure an effective compensation of the armature reaction and produce an effective field through the subdivision of the stator windings into two different sections so arranged and distributed as to obtain the desired effect with a minimum resistance and inductance in said winding. To this end the stator has a uniformly distributed compensating winding made of form coils placed in the rear or bottom of the slots and a skein wound field winding also uniformly distributed in the front or top of the slots above the compensating winding.

In the preferred construction the compensating winding is made of somewhat heavier wire than the field winding, and the effective ampere turns of the compensating winding is made to somewhat exceed that of the armature winding, the differential field so created assisting that produced by the field winding.

The foregoing and other objects of the invention will be best understood from the following description of an exemplification thereof, reference being had to the accompanying drawings wherein Fig. 1 is a diagrammatic view of a universal motor embodying the invention;

Fig. 2 is a transverse sectional view through a portion of the stator and the armature of the improved motor illustrating the arrangement of the windings within the slots;

Fig. 3 is an elevational view of the armature of the improved motor in partly assembled condition illustrating the arrangement of the connections of the armature coils to the commutator bars;

Figure 4A:
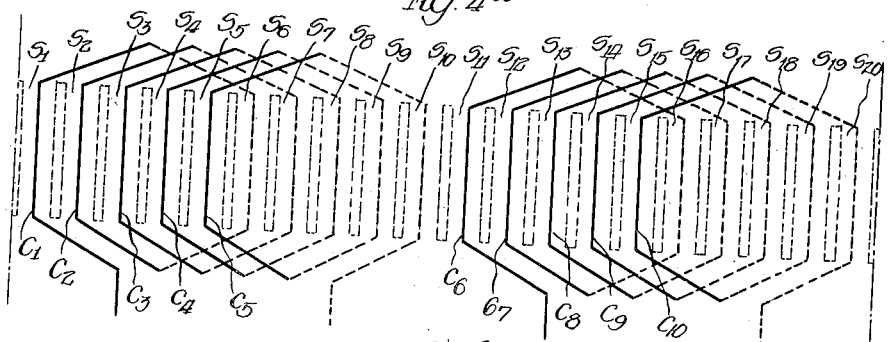
Fig. 4a is a developed view of the compensating winding.

Very great difficulties are encountered in the application of universal motors on account of the limitations in size and capacity that give the desired universal characteristics and substantially the same power and speed whether supplied with direct current or alternating current of commercial frequencies. In many industrial applications it is also of extreme importance to make the size of the motor as small as possible while retaining fully the universal characteristics thereof, and this likewise has been a source of great difficulties.

As is known, universal motors utilize, in addition to the commutator type armature winding, field windings that must fulfill two requirements, namely compensate the armature reaction and create the field necessary to produce the desired torque. In order to give the desired universal characteristics, the windings should have as small inductance as possible and also have low resistance in order to keep the losses at a minimum. Various efforts have been made in the past to secure windings that would give such results, but heretofore no universal motors were available that would continuously develop a power output of the order of one horse power while retaining the same operating characteristics under direct current as well as alternating current operation.

According to our invention limitations in output on such motors are decreased by a combination of windings of the field member which reduces the amount of inductance and resistance of the motor circuit while at the same time giving the required compensating and field action. The motor illustrated in the drawings exemplifies a novel winding arrangement of our invention. As shown in Fig. 1 the motor comprises a rotor 1 provided with an armature winding A of the commutator type, the coils of said winding being connected to segments 13 of a commutator 4. The armature 1 is made of circular iron laminations 5 having partially open slots $B_1$ to $B_{14}$ indicated in developed view in Fig. 5. The armature 1 is arranged to rotate within a stator 7 made likewise of circular laminations 8 surrounding the armature, these laminations being also provided with partially open slots $S_1$ to $S_{20}$. Within these slots of the stator are disposed two windings, a compensating winding C in the rear or bottom portion of the slots, and a field winding F on the front or top portion of the slots above the compensating winding.

According to our invention the compensating winding C is made of form coils $C_1$ to $C_{10}$ as shown in Fig. 4a, these coils being distributed uniformly over the slots of the stator. In the example shown in the drawings the stator has twenty slots. The compensating winding consists of ten coils, each coil having a span of five slots, there being only one coil side of a compensating coil in one slot of the stator. Five of the coils $C_1$ to $C_5$ are arranged in overlapped relation in one half of the stator slots and the other five coils $C_6$ to $C_{10}$ are similarly disposed in the other half of the stator slots. In assembling the coils in each half of the stator slots, one coil $C_1$, for instance, is first placed in the slots $S_1$ and $S_6$. The second coil $C_2$ is then placed in the next adjacent slots $S_2$, $S_7$ and so on until all the five coils $C_1$ to $C_5$ have been placed in the slots $S_1$ to $S_{10}$. In a similar way the coils $C_6$ to $C_{10}$ are assembled in the slots $S_{11}$ to $S_{20}$. Each coil is usually wound separately before being placed in the slots and the ends of the individual coils are connected in series to form a continuous winding uniformly distributed over the periphery of the stator. Each coil has a relatively large number of turns, but for purposes of simplification we have indicated in the drawings each coil as if composed of a single turn only.

Figure 4B:
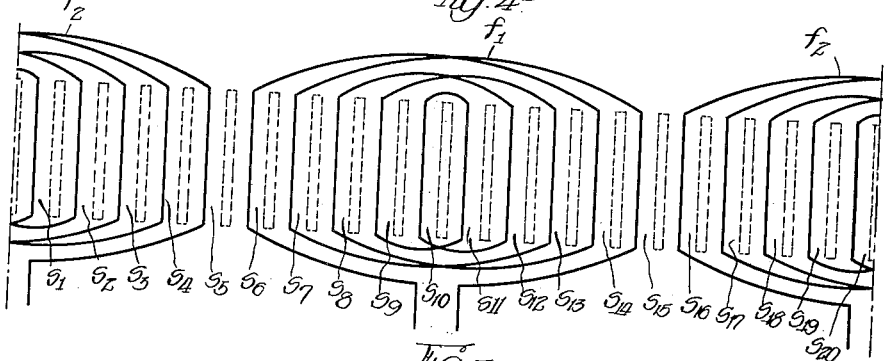
Fig. 4b is a developed view of the field winding.

The field winding F disposed above the compensating winding is likewise uniformly distributed over the slots of the stator, but instead of being made of a series of form coils, it is of the skein type and is composed of two coils $f_1$, $f_2$ distributed respectively in slots $S_6$ to $S_{15}$ and $S_{16}$ to $S_5$ as shown in Fig. 4b. Each coil is likewise composed of a number of turns and as shown in the drawings is wound in place by first looping the coil around two adjacent slots, for instance, $S_{10}$, $S_{11}$, and then twisting it and then placing it in the next adjacent slots $S_9$, $S_{12}$, and so on until the entire coil has been wound in place. As seen by comparing Fig. 4a to Fig. 4b the field coils $f_1$ and $f_2$ are so wound that the resultant field induced thereby is 90° displaced against the field induced by the compensating coils $C_1$ to $C_{10}$.

The foregoing arrangement of the stator windings contributes materially to reduction of the inductance and the resistance of the motor circuit. By making the compensating winding in the form of form coils disposed at the bottom of the slots, it is possible to keep the total length of the winding heads much smaller than if said winding were made with skein wound coils because on account of the greater depth of the slots a skein coil would have to be so long that the total length of turns therein would exceed the length of form coil turns.

Furthermore, there is a limit in the number of turns as well as the thickness of wire that can be employed in skein coils because, if the total thickness of the skein coils is too large, the winding heads become too long at the point where the turns of the coil overlap and furthermore the winding manipulation becomes cumbersome and short circuits between the individual turns are more likely to develop. Because of the use of form coils for the winding disposed at the bottom of the slots, it is possible to make this winding of somewhat thicker wire so that the total resistance of this part of winding may be held low and the resulting losses reduced to a low value. This is important because it is much more difficult to dissipate the heat from the part of the winding which is in the interior of the slots than from the part of the winding on the outside thereof. Accordingly, the reduction of the resistance in the inner part of the winding, and the consequent better distribution of the losses, materially increase the output that can be obtained with a given size of motor. On the other hand, it is of great advantage to make the field winding, which is disposed on the top of the compensating winding, of the skein type because this part of the winding is disposed near the periphery of the stator and is accordingly wound very flat. The small depth of winding makes it possible to use a relatively short skein coil and the total length of the turns becomes smaller than if form coils were used. Furthermore, since this part of the winding is on the surface and is cooled to a better degree than the winding embedded in the interior of the slots, it may be made of somewhat thinner wire which greatly facilitates the placing of the skein coil in the slots.

By the foregoing choice of the two different types of winding forms, there is obtained a very effective combination resulting in a minimum length of winding heads, best distribution of the losses and lowest total inductance of the coils. The coils which are deeper in the slots are made of heavier wire which gives less resistance and is also less adapted for use in a skein winding. The coils which are on the surface of the slots are made of thinner wire adapting them more for the skein type winding, this thinner wire being permissible from the standpoint of the heat losses because of the position near the surface of the winding where it is capable of dissipating more heat. This choice of form coils of heavy wire for the compensating winding and the skein wound coils of thin wire for the field winding adapts itself also to the special electrical requirements of a universal motor inasmuch as the compensating winding must ordinarily have a relatively large number of turns, and the field winding should ordinarily have a relatively small number of turns. It is relatively easy to make a skein winding with coils of a thin wire and small number of turns while on the other hand it is relatively easy to make a form coil winding in which each coil has a relatively large number of turns of the heavier wire.

The foregoing relative arrangement of the compensating winding and the field winding constitutes a departure from well established practices, as ordinarily the compensating winding is placed near the surface of the slots in order to be as close to the armature as possible. However, for the reasons pointed out above, it is possible to obtain better distribution of the losses as well as a very material decrease of the inductance and resistance of the circuit by placing the compensating coil with a large number of turns of heavy wire in the bottom of the slots, and the field coil of a small number of turns of thin wire near the entrance to the slots.

The motor, according to our invention, embodies also an improvement in the armature winding which enables reduction of the total length of the armature, thereby permitting construction of motors of less length than in the prior art practice.

Figure 5:
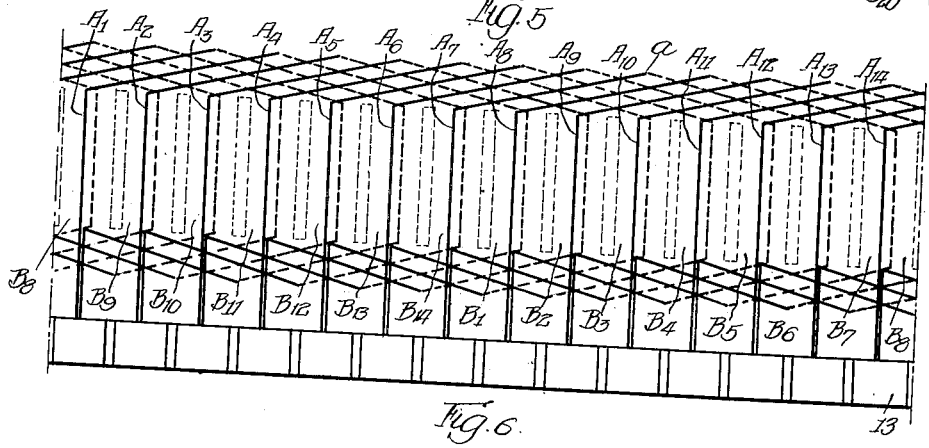
Fig. 5 is a developed view of the armature winding.
Figure 6:
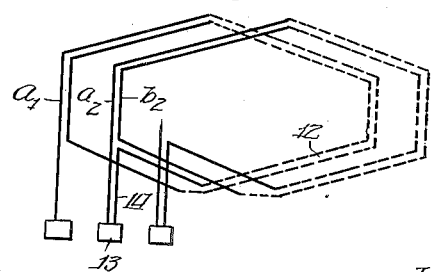
Fig. 6 is a developed view of a section of the armature winding illustrating the arrangement of the armature coil connectors to the commutator segments.

As shown by reference to Figs. 3, 5 and 6, the armature winding is of the lap type and, in the exemplification shown, is composed of coils $A_1$ to $A_{14}$. One side of the coil, shown in heavy lines, is positioned in the top of the slot, and the other side of each coil, shown in dotted lines, is positioned in the bottom of the slots so that each slot has one coil side in the bottom and one coil side in the top in the manner usually followed in commutator type windings of this style. The span of each coil is made approximately equal to the pole division, and as shown in the drawing each coil has a width corresponding to seven slot divisions.

In the ordinary practice of connecting the individual coils to the associated commutator bars, each coil is connected to a commutator bar disposed approximately in the middle plane through the coil so that the two wires connecting the end of one coil and the beginning of the other coil to each segment are approximately equal in length.

According to our invention, the connections to the commutator segments are not made to the bars of the commutator which are positioned midway between the sides of the associated coils, but to segments which are positioned approximately opposite the side where the associated coils begin or end. In other words, the wire extensions 11 from the coils to the commutator segments are led away from the points of the coils where the wire leading from the end of one coil would be placed into the slot which is to receive the side of the next following coil, as shown in Figs. 3 and 6. Taking coil A, for instance, the same is wound in the usual way, one coil side being placed in slot $B_1$ and the other coil side in the slot $B_6$. The coil is wound this way until the desired number of turns is placed in the slots. After the coil is finished, the end 12 of the coil is brought to a commutator segment 13 by first winding the wire over the full head of the coil just as if the wire were to be placed in the slot $B_2$ for winding the next coil $A_2$. Prior to bringing the wire in the slot $B_2$, it is branched off opposite said slot at 14 to provide a sufficient length for connecting to a commutator segment positioned opposite said slot, the wire being then returned upon itself and brought again into the slot $B_2$, whereupon the next coil $A_2$ is wound in place. The same procedure is then followed in making the connection to the next commutator segment so that when the entire armature winding is finished the commutator segment connectors lead off from points of the armature periphery facing the slots. In this way there are no extra winding heads necessary for making the commutator segment connections. The latter are extremely short and may be positioned in the space between the winding heads of the continuously wound coils and the commutator segments without occupying any extra length in the direction of the armature axis.

The various windings are connected in series, as shown in Fig. 1, the two halves of the compensating winding being connected to one brush 16 bearing on the commutator and the two halves of the field winding being connected to the other brush 17 bearing on the commutator.

In the ordinary practice, the compensating winding C is made to have such number of turns as to substantially neutralize the field induced by the currents flowing in the armature so that the resultant active field is along an axis symmetrical to the field winding F. We have found that a more advantageous arrangement of the windings in the coils within the slots of the stator may be obtained if the compensating is made with somewhat more turns than required for the compensation of the armature field so that a small part of the compensating winding field acts additively to the field produced by the main field winding. This arrangement is desirable because it is important that the number of turns in the skein coil shall be kept at a relatively low value so as to facilitate twisting the coil when placing it in the slots. By reducing somewhat the number of turns in the skein coil and producing the additional field strength with extra turns on the form wound coils of the compensating winding, it is possible to obtain the desired field strength under a more favorable winding distribution and with less winding inductance and resistance than may be possible without such arrangement.

As pointed out above, the employment of the improved winding arrangement enables the construction of universal motors of much greater power than the processes following heretofore. Thus with a motor having armature dimensions of the sizes indicated in Figs. 2 and 3 and employing an armature of 42 coils with 9 turns per coil of number 21 wire and a stator having a compensating winding composed of 10 coils with 22 turns of number 16 wire and a main field winding of 10 coils each composed of 8 turns of number 18 wire, we are able to develop continuously one horse power.

We do not desire to limit ourselves to the particular details of construction and arrangements shown hereinabove since our invention may be embodied in various other modifications which will suggest themselves to those skilled in the art. Accordingly, we desire that the appended claims be given a broad interpretation commensurate with the scope of the invention.

We claim:

1. A universal motor having an armature of the commutator type, and a field member provided with a slotted core having an armature compensating winding in the bottom of the slots and a field winding of less turns than the compensating winding disposed in the slots above said compensating winding, said compensating winding and field winding being connected in series with the armature.

2. A universal motor comprising an armature, and a field member, a commutator type winding on said armature, said field member having a slotted core, a compensating winding of a relatively large number of turns in the slots of said field member, and a field exciting winding of a relatively small number of turns in the slots of said field member above said compensating winding, said compensating winding being composed of individually wound coils.

3. A universal motor comprising an armature member and a slotted field member, a commutator type winding on said armature member, a uniformly distributed armature compensating winding on said field member, and a uniformly distributed field exciting winding on said field member, said windings being connected in series, one of said field member windings being disposed in the rear portion of the slots, the other of said field member windings being disposed in the slots in front of said first mentioned field member winding and being composed of a conductor of less cross section.

4. A universal motor comprising an armature member and a slotted field member, a commutator winding on said armature, an armature compensating winding disposed in the rear portion of the slots of said field member, and a field exciting winding disposed in the slots of said field member above said compensating field winding, said armature winding being connected in series with said field member windings, said field exciting winding being wound with a conductor of less cross section than said armature compensating winding.

5. A universal motor comprising an armature and a field member having a plurality of slots, a commutator type winding on said armature, an armature compensating winding in the slots of said field member, said armature compensating winding being composed of a plurality of individually wound coils disposed in said slots, and a skein wound field exciting winding also disposed in the slots of said field member above said compensating winding, said windings being connected in series with said armature winding.

6. A universal motor comprising an armature member and a field member having a plurality of uniformly disposed slots, an armature compensating winding uniformly distributed in said slots, said armature compensating winding being composed of a plurality of individually wound coils positioned in the bottom portions of said slots, and a field exciting winding uniformly disposed in said slots above said armature field compensating winding, said field exciting winding being skein wound, said armature winding being connected in series with said field member windings.

7. A universal motor comprising an armature member and a field member having a plurality of uniformly disposed slots, an armature compensating winding uniformly distributed in said slots, said armature compensating winding being composed of a plurality of individually wound coils positioned in the bottom portions of said slot, and a field exciting winding uniformly disposed in said slots above said armature field compensating winding, said field exciting winding being skein wound of a conductor of less cross section than said armature compensating winding, said windings being connected in series.

8. In an electric motor, a commutator type armature comprising a core having a plurality of slots, a plurality of winding coils uniformly distributed in said slots, a commutator having a plurality of commutator segments, said coils having branchless winding heads extending directly from slot to slot and wound one upon the other, and connectors between said coils and said commutator segments, said connectors consisting of pairs of doubled wires branching off from the points of the consecutively connected coils positioned adjacent the slots where one coil joins the next adjacent coil, one of the doubled wires of each connector being connected to the end of one coil, the other of the doubled wires being connected to the beginning of the next succeeding coil.

9. In an electric motor, an armature of the commutator type comprising a core having a plurality of slots, a winding having a plurality of coils uniformly distributed in said slots, a commutator having a plurality of commutator segments positioned on one side of said winding, said coils having branchless winding heads extending along the shortest path directly from slot to slot, and coil connectors leading from the coils of said windings to said commutator segments, said connectors consisting of pairs of doubled wires branching off from the points of the consecutively connected coils where the winding head at the end of one coil enters into the slot of the next adjacent coil, one of the doubled wires being connected to the winding head of one coil and the other of the doubled wires being connected to the end of the next succeeding coil side positioned in the slot.

10. In an electric motor, an armature of the commutator type comprising a core having a plurality of slots, a winding having a plurality of coils uniformly distributed in said slots, a commutator having a plurality of commutator segments positioned on one side of said winding, said coils having branchless winding heads extending along the shortest path directly from slot to slot, and coil connectors leading from the coils of said windings to said commutator segments, said connectors consisting of pairs of doubled wires branching off from the points of the consecutively connected coils where the winding head at the end of one coil enters into the slot of the next adjacent coil, one of the doubled wires being connected to the winding head of one coil, and the other of the doubled wires being connected to the end of the next succeeding coil side positioned in the slot, each connector being connected to the commutator segment substantially in close alignment with the slot from which said connector leads.

11. A universal motor comprising an armature and a field member having a plurality of uniformly disposed slots, an armature compensating winding comprising a plurality of coils uniformly distributed in said slots, each compensating winding coil comprising two coil sides disposed within the slots and two connecting winding heads extending on opposite sides of the armature between the coil sides within the slots, and a field exciting winding uniformly disposed in said slots above said armature field compensating winding, said field exciting winding comprising a skein coil having four or more coil sides disposed in four or more slots distributed along the periphery of the core so that the conductors of the skein coil are closed upon themselves after passing successively through at least four or more field member slots.

12. A universal motor comprising a commutator type armature and a field member surrounding the same, said armature comprising a core having a plurality of slots, a plurality of winding coils uniformly distributed in said slots, a commutator having a plurality of commutator segments, said coils having branchless winding heads extending directly from slot to slot and wound one upon the other, and connectors between said coils and said commutator segments, said connectors consisting of pairs of doubled wires branching off from the points of the consecutively connected coils positioned adjacent the slots where one coil joins the next adjacent coil, one of the doubled wires of each connector being connected to the end of one coil, the other of the doubled wires being connected to the beginning of the next succeeding coil, and said field member having a slotted core, a compensating winding of a relatively large number of turns in the slots of said field member, and a field exciting winding of a relatively small number of turns in the slots of said field member above said compensating winding, said compensating being composed of individually wound coils.

In testimony whereof we have hereunto subscribed our names this 12th day of June, 1928.

ALEX A. CLARKE.
JOHN WILKIEWRICZ.